United States Patent [19]
Jenkins et al.

[11] 4,310,453
[45] Jan. 12, 1982

[54] PIGMENT DISPERSIONS CONTAINING COPOLYMER OF OXAZOLIDINYLALKYL OR OXAZOLIDINYLALKOXYALKYL (METH)ACRYLATE

[75] Inventors: Raymond F. Jenkins, Mt Laurel, N.J.; Graham Swift, Blue Bell, Pa.

[73] Assignee: Tenneco Chemicals, Inc., Saddle Brook, N.J.

[21] Appl. No.: 114,544

[22] Filed: Jan. 23, 1980

[51] Int. Cl.³ .......................... C08J 3/20; C08L 39/04
[52] U.S. Cl. ............................. 260/42.54; 260/42.52; 260/42.44
[58] Field of Search ................ 260/42.52, 42.54, 42.44

[56] References Cited

U.S. PATENT DOCUMENTS

| | | | |
|---|---|---|---|
| 3,037,006 | 5/1962 | Hankins et al. | 260/80.5 |
| 3,502,627 | 3/1970 | Dupont | 260/86.1 |
| 3,829,397 | 8/1974 | Sheppard | 260/31.8 M |
| 3,878,140 | 4/1975 | Sheppard | 260/17 R |
| 3,884,852 | 5/1975 | Sheppard | 260/17 R |
| 3,893,960 | 7/1975 | Sheppard | 260/23 AR |
| 3,954,397 | 5/1976 | Desiderio | 8/41 R |

*Primary Examiner*—Carman J. Seccuro
*Attorney, Agent, or Firm*—Evelyn Berlow

[57] ABSTRACT

Low molecular weight addition copolymers, of (1) (meth)acrylic acid esters of alcohols such as methanol and butanol with (2) esters of alcohols such as N-(β-hydroxyethyl)oxazolidine and unsaturated acids such as a (meth)acrylic acid, and (3) optional α,β-ethylenically unsaturated monomers such as a (meth)acrylic acid, are found to be exceptional dispersants for inorganic and organic pigments and colorants which are insoluble in organic solvents, for lacquers, and are compatible with practically all types of lacquer resins such as vinyls, nitrocellulose, and alkyds, and with many other types of lacquer film-forming materials. Usually, when small amounts of unsaturated carboxylic acids, or other polar monomers and combinations thereof, are incorporated in the polymers, they become improved pigment dispersants. Such pigment dispersions, unexpectedly, can be let down with many types of synthetic resins and used by air-drying or baking the coated articles. Lacquers for metals, paints and printing inks are examples of uses for such blends.

10 Claims, No Drawings

PIGMENT DISPERSIONS CONTAINING COPOLYMER OF OXAZOLIDINYLALKYL OR OXAZOLIDINYLALKOXYALKYL (METH)ACRYLATE

This invention relates to copolymers of unsaturated esters of hydroxyalkyl oxazolidines and unsaturated acids.

Acrylic polymers have long been used as modifiers for various other polymers, including alkyds and oil-modified alkyds, cellulose esters such as nitrocellulose and cellulose acetate butyrate, and other vinyl polymers such as polyvinyl chloride polymers. However, in the past, acrylic polymers were limited as to compatibility in that only certain classes of resins or polymers could be modified with a given acrylic polymer. An example of this is U.S. Pat. No. 2,964,483 (U.S. Class 260-22), which states that " . . . alkyds having oil lengths longer than 45% tend to blend less well with vinyl copolymers . . . " than do short-oil alkyds. While there are acrylics compatible with one or more, but not all, of short oil (<46% oil), medium oil (46-55% oil), long oil (56-70% oil), and very long oil (>71% oil) alkyds and other modified film-forming polymers such as the cellulose esters, a nearly universally compatible acrylic pigment dispersant which also has other necessary and desirable properties has long been sought. One successful solution to the problem is found in U.S. Pat. No. 3,940,353, assigned to the assignee of the present application. However, the isobornyl methacrylate monomer is expensive, and in some cases labor intensive polymerization procedures are required. The products of the present invention give greater color strength, higher gloss, and have an excellent potential for cost savings, as compared with the products of said U.S. Pat. No. 3,940,353.

Polymers comprising the oxazolidine types of monomers have been disclosed heretofore in dye solutions, pigmented coating compositions, and the like. See, for example U.S. Pat. Nos. 3,037,006; 3,829,397; 3,878,140; 3,884,852; 3,893,960; and 3,954,397. Their efficacy in "wetting" and grinding pigment dispersions is not suggested, however.

It has now been found that particularly useful copolymers are those of ethylenically unsaturated monomers containing 0.5% to 40%, preferably, 0.5% to 15%, by weight of an N-acryloxyalkyl-oxazolidine, an N-acryloxyalkyltetrahydro-1,3-oxazine or the corresponding compound in which the "alkyl" linkage is replaced by an alkoxyalkyl or an poly(alkoxyalkyl) linkage, such as those having the formula I:

$$H_2C=C-C-A'-N \begin{array}{c} (CH_2)_{m'} \\ \diagup \\ \diagdown \\ O \\ \diagup \\ C \\ \diagup \diagdown \\ R^1 \quad R^2 \end{array}$$

with R, O above the chain.

wherein
R is $(CH_2)_{n'}-1H$
$R^1$, when not directly joined to $R^2$, is selected from the group consisting of hydrogen, phenyl, benzyl, and $(C_1-C_{12})$ alkyl groups,
$R^2$, when not directly joined to $R^1$, is selected from the group consisting of hydrogen and $(C_1-C_4)$ alkyl groups,
$R^1$ and $R^2$, when directly joined together, form a 5- to 6-carbon ring with the attached carbon atom of the ring in the formula, i.e., $R^1$ and $R^2$, when joined together, are selected from the group consisting of pentamethylene and tetramethylene,
A' is $—O(CH_2)_m—$ or $—(O\text{-alkylene})_n—$ in which (O-alkylene)$_n$ is a poly(oxyalkylene) group, having a molecular weight in the range from 88 to 348, n thus depending on said molecular weight, in which the individual alkylene radicals are the same or different and are either ethylene or propylene, and m and m' are integers having a value of 2 to 3.
n' is an integer having a value of 1 to 2

The compounds of formula I can hydrolyze under various conditions to secondary amines. The hydrolysis produces products having the formula IA:

$$H_2C=C-C-A'-N-(CH_2)_{m'}-OH$$

with R, O, H above the chain.

The compounds of formula I are disclosed in U.S. Pat. Nos. 3,037,006 and 3,502,627 in the hands of a common assignee, and their corresponding foreign applications and patents. Any of the monomeric compounds disclosed therein may be used in making the copolymers to be used in the present invention.

Examples of compounds of formula I include:
Oxazolidinylethyl methacrylate
Oxazolidinylethyl acrylate
3-(gamma-methacryloxypropyl)-tetrahydro-1,3-oxazine
3-(β-methacryloxyethyl)-2,2-pentamethyleneoxazolidine
3-(β-methacryloxyethyl)-2-methyl-2-propyloxazolidine
N-2-(2-acryloxyethoxy)ethyl-oxazolidine
3-[2-(methacryloxy(propoxy)$_{3.1}$-(ethoxy)$_2$)-ethyl]-2-methyl-5-methyloxazolidine
N-2-(2-methacryloxyethoxy)ethyloxazolidine
N-2-(2-methacryloxyethoxy)ethyl-5-methyl-oxazolidine
N-2-(2-acryloxyethoxy)ethyl-5-methyl-oxazolidine
3-[2-(2-methacryloxyethoxy)ethyl)]-2,2-pentamethyleneoxazolidine
3-[2-(2-methacryloxyethoxy)ethyl)]-2,2-dimethyloxazolidine
3-[2-(methacryloxyethoxy)ethyl)]-2-phenyloxazolidine.

The preferred compounds falling within the formula I have the formula $$H_2C=C-(CH_2)_{n-1}H \qquad \begin{array}{c} (CH_2)_{m'} \\ \diagup \\ COO—(CH_2)_m-N \\ \diagdown \\ O \\ \diagup \\ C \\ \diagup \diagdown \\ R^1 \quad R^2 \end{array} \qquad IB$$

where
n' is an integer having a value of 1 to 2,
m and m' are integers having a value of 2 to 3,
$R^1$, when not directly joined to $R^2$, is selected from the group consisting of hydrogen, phenyl, benzyl, and $(C_1-C_{12})$alkyl
$R^2$, when not directly joined to $R^1$, is selected from the group consisting of hydrogen and $(C_1-C_4)$alkyl groups, and R¹ and R², when directly joined together, form a 5- to 6-carbon ring with the attached carbon atom of the ring in the formula, i.e., R¹ and R², when joined together, are selected from the group consisting of pentamethylene and tetramethylene.

The copolymers also contain 60% to 99.5% of styrene, vinyl toluene, or, preferably, at least one ester of (meth)acrylic acid, with 0% to about 10%, preferably from 0.2% to about 5% of an $\alpha,\beta$-ethylenically unsaturated carboxylic acid monomer, and have molecular weights, as Mw of about 6,000 to 50,000, preferably about 12,000 to 20,000, and as Mn, of about 3,000 to 15,000, preferably below about 10,000, as determined by gel permeation chromatography. As used herein, "(meth)acrylic" means acrylic or methacrylic, or both.

The copolymers are compatible with essentially all types of alkyds (styrenated, chain-stopped, methacrylated, etc.), thermosetting acrylic polymer blends with aminoplasts, thermoplastic acrylics, such as nonaqueous dispersions of acrylic resins in organic liquids in which they are insoluble. The polymers of the present invention are also compatible with many other film forming resins including the cellulosics, vinyls, aminoplasts, chlorinated rubber, etc. With the alkyds, for example, the subject polymers, in addition to the unique compatibility with all film-forming alkyd resin types, at higher quantities can provide improved drying time, color and gloss, hardness development, and water spotting resistance, and permit higher spray solids. Suitable ratios of (A) the film-forming resin and (B) the low molecular weight copolymer of the oxazolidinyl monomer are such that the weight ratio of (A) to (B) is between 1,000:1 and 4:1. Optionally up to 10% preferably up to 5% by weight of one or more of an $\alpha,\beta$-ethylenically unsaturated carboxylic acids may be included as comonomers. Such materials provide the known functions of improving adhesion of the acrylic polymers and other polymers modified therewith and of improving pigment dispersibility in the subject acrylic polymers.

The acrylic acid and methacrylic acid ester monomers include methyl acrylate, ethyl acrylate, propyl acrylate, isopropyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, octadecenyl acrylate, n-amyl methacrylate, sec-amyl methacrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate, butoxyethyl acrylate or methacrylate or other alkoxyethyl acrylate or methacrylate, methyl methacrylate, ethyl methacrylate, propyl methacrylate, isopropyl methacrylate, butyl methacrylate, sec-butyl methacrylate, and tert-butyl methacrylate, tert-amyl methacrylate, tert-butyl or tert-amyl acrylate, cyclohexyl acrylate or methacrylate, isobornyl methacrylate, and phenoxyethyl methacrylate. The alcohol moiety has 1–18 carbons.

Preferred are acrylic and methacrylic acid esters, the homopolymers of which have a Tg of at least 10° C. and preferably at least about 50° C. Among the acrylic acid and methacrylic acid esters, one or more $C_1$–$C_4$ alkyl methacrylates are preferred, and a blend of methyl methacrylate and butyl methacrylate is especially preferred. Among the $\alpha,\beta$-unsaturated acids a (meth)acrylic acid, especially methacrylic acid, is preferred.

Besides the essentially non-functional monomers just recited, there may be included within the copolymer up to 5% by weight of various reactive monomers including the $\alpha,\beta$-unsaturated carboxylic acids, half esters, and half amides of $\alpha,\beta$-unsaturated dicarboxylic acids, and salts thereof with ammonia, an alkali-metal, including sodium, potassium or lithium, or a volatile water-soluble amine such as dimethylamine or trimethylamine.

Examples of copolymerizable ethylenically unsaturated monocarboxylic or polycarboxylic acids are sorbic, cinnamic, vinyl furoic, α-chlorosorbic, p-vinylbenzoic, acrylic, methacrylic, maleic, fumaric, aconitic, atropic, crotonic, acryloxypropionic, and itaconic acid, or mixtures thereof, with itaconic acid and the $\alpha,\beta$-unsaturated monocarboxylic acids, particularly methacrylic acid and acrylic acid, being preferred. Other copolymerizable acid monomers include the alkyl half esters or partial esters of unsaturated polycarboxylic acids such as of itaconic acid, maleic acid, and fumaric acid, or the partial amides thereof. Preferred half esters are the lower alkyl ($C_1$–$C_6$) esters such as methyl acid itaconate, butyl acid itaconate, methyl acid fumarate, butyl acid fumarate, methyl acid maleate, and butyl acid maleate. Such partial esters and partial amides are considered to be "$\alpha$-$\beta$-unsaturated monocarboxylic acids," and the term as used herein includes such esters and amides.

The copolymer additives of the invention may be made by a variety of methods. One suitable method is by bulk polymerization of the monomeric ingredients. In accordance with that process a suitable amount of monomers is mixed with an addition polymerization catalyst, such as azobisisobutyronitrile, lauroyl peroxide, acetyl peroxide, t-butyl peracetate, t-butyl hydroperoxide, etc. at a temperature sufficient to cause polymerization such as in the range of 25° to 100° C. or higher. Commonly used molecular weight regulators such as the aliphatic mercaptans, for example, n-dodecyl mercaptan, are also included in the polymerization mixture. High temperature (90°–150° C.) solution polymerization also gives low molecular weight polymers.

The copolymers also may be prepared by granular, emulsion, or solution polymerization of the several comonomers and, if desired, a portion having a preferred narrow range of molecular weight may be extracted from the products of such polymerization procedures by preferential solvent techniques in accordance with well-known practice. A suitable method of preparing the copolymers involves introducing suitable proportions of the comonomers with a solvent which may be a solvent for both the monomers and the copolymer and with a catalyst, such as one of the well-known organic peroxide catalysts, such as benzoyl peroxide, or one of the well-known azo catalysts, such as $\alpha,\alpha'$-azodiisobutyronitrile, with the chain length regulator, into a reaction vessel in which the mixture is heated with continuous agitation for a period of 2 to 9 hours followed by cooling.

The pigment grind or dispersion consists essentially of 5–35% of said oxazolidine-containing copolymer, 5–75% of said solvent, and 20–60% of the pigment. Thus, the nonvolatile solids content is between about 25% and 95%.

The method of dispersing or grinding pigment in the oxazolidine-containing copolymer pigment dispersant is not critical provided a smooth, uniform dispersion of finely divided pigment is produced. Examples of suitable equipment well known in the art are ball, pebble, sand, buhrstone, roller, and colloid mills and kneader-mixers, high speed dispersers such as "Cowles" dispersers, "Banbury", "Warner-Pfleideres," or any apparatus for preparing concentrated pigment dispersions.

In comparison with the same composition in a thinned or diluted form ready for application, the concentrated form is more resistant to pigment settling during storage, is cheaper to store and ship because less weight and space are involved, and is in a more adaptable condition for the addition of thinning and/or other modifying materials by the ultimate user to adjust the composition to his own liking. Therefore, the lacquers may be prepared by merely admixing appropriate organic liquids and the film-forming resin with the pigment dispersion. The maximum degree of concentration, i.e., the maximum non-volatile solids content, is limited only by the maximum consistency which can be conveniently handled by the manufacturer and the ultimate user.

Examples of suitable pigments include titanium dioxide, carbon black, iron blues, yellow iron oxides, phthalocyanine blues and greens; metal oxides, hydroxides, sulfides, sulfates, silicates and chromates; aluminum flake, bronze powders, pearl essence, and various fillers or extenders such as talc, barytes, china clay and diatomaceous earth.

The lacquer made from the pigment grind copolymer mixture and the film-forming resin vehicle may contain one or more external plasticizers in an amount up to 50% by weight of the weight of the copolymer. Examples of plasticizers that are suitable include benzyl butyl phthalate, dibutyl phthalate, triphenyl phosphate, 2-ethyl hexyl benzyl phthalate and dicyclohexyl phthalate. Other well-known plasticizers which may be employed include diallyl phthalate, dibenzyl phthalate, butyl cyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di 2-ethylhexyl ester of hexamethylene diphthalate, and di(methylcyclohexyl) phthalate. The particular plasticizer and the amount thereof used are chosen in accordance with the demand for compatibility.

Various solvents may be employed, such as toluene, xylenes, acetone, methyl ketone, methyl isobutyl ketone, methyl isopropyl ketone, amyl alcohol, 2-ethoxyethyl acetate, ethyl acetate, butyl lactate, amyl acetate, methyl acetate, denatured ethyl alcohol, isopropanol, diacetone alcohol, cyclohexanol, ethylene dichloride, diisobutyl ketone, cyclohexanone, 2-butoxyethanol, the Carbitol ® and Cellosolve ® solvents, furfural, petroleum naphtha, boiling in the range of about 87° to about 145° C., cyclohexane, hexane, aromatic hydrocarbon mixtures, such as "Solvesso 150," and also various aliphatic, naphthenic and aromatic naphthas. While certain of these solvents cannot be used alone because of lack of solvent power for the copolymers, they can in a mixture with others. Thus, it is usually necessary to use a polar cosolvent or an aromatic hydrocarbon cosolvent when aliphatic hydrocarbons are utilized. Obviously, mixtures of such solvents are generally quite useful.

Among the resins which may be modified by the polymers of the invention are the alkyds, including the drying oil-modified alkyds, rosin-modified alkyds, mixed or co-reacted alkyds and aminoplasts, mixed or co-reacted alkyds and epoxy resins, mixed or coreacted alkyd/aminoplast/epoxy resins, styrenated (meth)acrylated alkyds, mixed or coreacted epoxidized esters of higher fatty acids with aminoplast resins and so on.

Other examples of alkyds and a relatively complete discussion of alkyd resins is found in the encyclopedia of Chemical Technology, by Kirk and Othmer, Second Edition, Volume 1, pages 851–882, incorporated herein by reference. As this reference points out, as the amount of modifying drying or non-drying natural oil is increased, the amount of dibasic acid in the polyester thereof with the polyol is decreased.

The copolymers are compatible with various aminoplasts or thermosetting resin-forming precondensates including the condensates of formaldehyde with phenol, urea, thiourea, N,N'-ethyleneurea, aminotriazines such as melamine, benzoguanamine, and acetoguanamine, as well as the alkylated formaldehyde condensates with the various compounds just named in which the alkylation is effected with methanol or in some cases ethanol. A small amount of an amine salt, such as triethylamine maleate, may be added for the purpose of developing an acid on heating which serves to catalyze the insolubilization of the condensate during baking. The compositions containing the thermosetting resin-forming condensates may be applied to any of the various substrates.

In addition to the alkyds discussed by Kirk and Othmer and those of the examples, reference may be had to "Synthetic Resins for Coatings," Bulletin No. C-160, February 1966, Rohm and Haas, Resins Department, Philadelphia 19105, which is incorporated herein by reference and which gives further details of lacquer and enamel formulations with alkyds.

EXAMPLE 1

Composition: 74.3 BMA/20 MMA/5.2 OXEMA 95[1]/0.5 MAA

Procedure

[1] 95% oxazolidinylethyl methacrylate 183 grams of Cellosolve ® acetate is added to a resin kettle equipped with a mechanical stirrer, a condensor, a monomer addition funnel, an initiator addition funnel and a nitrogen inlet and then heated in an oil bath to 130°±5° C. in a nitrogen atmosphere with constant stirring. A monomer mix which contains 1190 grams of n-butyl methacrylate, 319.7 grams of methyl methacrylate, 84 grams of 95% oxazolidinylethyl methacrylate, 8.0 grams of glacial methacrylic acid and 54.5 grams of n-dodecyl mercaptan and an initiator solution which contains 40 gram of t-butyl peroctoate (98%) and 227 grams of Cellosolve acetate are prepared.

The monomer mix and most of the initiator are then added over about 2.5 hours while the reaction temperature is held at 130°±5° C. with heating or cooling as necessary. After adding the remaining initiator solution, about 25 grams, and heating for about 0.5 hr., 327 grams of Cellosolve acetate is then added and stirred until the product is uniform. The product is then cooled, packaged and characterized.

The product has a solids content of 65.5 wt % as determined by weighing a sampling of the polymer solution, baking the sample at 150° C. for 105 minutes, weighing the residue and calculating the percent solids. The product viscosity as determined with a Brookfield LVT viscometer, spindle #3 at 12 RPM is 5600 centipoises at 25° C. $\overline{M_w}=15000$ & $\overline{M_a}=4500$

EXAMPLE 2

Composition: 90 BMA/9.8 OXEMA-95/0.2 MAA

Procedure 175 grams of Cellosolve acetate is added to a resin kettle equipped in the same way as noted in Example 1 and heated to 105°±5° C. A monomer mix which contains 900 grams of n-butyl methacrylate, 98 grams of 95% oxazolidinylethyl methacrylate, 2 grams of methacrylic acid and 30 grams of n-dodecyl mercaptan and an initiator solution of 50 grams of tertiary butyl peroxypivalate (60% in mineral spirits) and 150 grams of Cellosolve acetate are prepared. The polymerization is conducted in the same manner as Example 1, but at 105°±5° C.

The solids content is 65.2% and the product viscosity (25° C.) is 2700 cps. $\overline{Mw}=14500$ & $\overline{Mn}=4800$

EXAMPLE 3

Composition: 33 BA/27 MMA/20 St/25 OXEMA-95/2 MAA

Procedure 550 grams of methyl amyl ketone is added to a resin kettle which is equipped as described in Example 1 and heated to 130°±5° C. A monomer mix which contains 330 grams of n-butyl acrylate, 200 grams of methyl methacrylate, 200 grams of styrene, 250 grams of 95% oxazolidinylethyl methacrylate, 20 grams of methacrylic acid and 30 grams of 2-hydroxyethyl mercaptan and an initiator solution of 30 grams of t-butyl peroctoate and 150 grams of methyl amyl ketone are prepared. After polymerization as in Example 1, the product is then cooled and characterized. The solids content is 59.6% and the product viscosity at 25° C. is 2350 cps. $\overline{Mw}=26400$ & $\overline{Mn}=3800$

EXAMPLE 4

Composition: 64 BMA/35 OXEMA-95/1 AA procedure 500 grams of xylenes is added to a resin kettle equipped as described in Example 1 and heated to 105°±5° C. A monomer mix which contains 640 grams of n-butyl methacrylate, 350 grams of 95% oxazolidinyl methacrylate, 10 grams of acrylic acid and 40 grams of n-dodecyl mercaptan and an initiator solution of 50 grams of tertiary butyl peroxy pivalate (75% in mineral spirits) and 150 grams of xylenes are prepared. The monomer mix and all but 20 grams of the initiator solution are added linearly over 4 hours to the kettle which is maintained at 150°±5° C. with heating or cooling as necessary. The remaining 20 grams of initiator solution is then added and the mixture is held at 105°±5° C., for a total of 1 hour. Then the product is packaged and characterized in the manner described in Example 1. The solids content is 60.5% and the viscosity is 1150 cps (25° C.). $\overline{Mw}=22300$ & $\overline{Mn}=8100$

EXAMPLE 5-8

Fifty pounds of Toluidine red, 100 pounds of the product of each of Examples 1-4, and 120 pounds of mineral thinner are ground on a roller mill until the pigment is well dispersed.

This pigment dispersion is then mixed with 538 pounds of a 50% solids modified alkyd resin and 152 pounds of added xylol to produce a 40% solids sprayable paint having good gloss and color development. Appropriate metal driers or siccatives may be added for the alkyl vehicle as required.

As used herein, the abbreviations have the following meanings:

| | |
|---|---|
| AA | Acrylic acid |
| BA | Butyl acrylate |
| IBOMA | Isobornyl methacrylate |
| t-BAEMA | Tertiary butyl aminoethyl methacrylate |
| BMA | Butyl methacrylate |
| MAA | Methacrylic acid |
| MMA | Methyl methacrylate |
| OXEMA-95 | Oxazolidinylethyl methacrylate, 95% pure |
| St | Styrene |

The monomers are of commercial purity. All parts are by weight unless otherwise stated.

EXAMPLES 9-12

Yellow iron oxide colorants are prepared:
50% Yellow Iron Oxide
15% (nonvolatile basis) OXEMA dispersant resin of Examples 1-4
35% Cellosolve Acetate The dispersions are premixed for five minutes on a Cowles high speed dispenser. After this step equal volumes of premix and Ceramedin are milled for five minutes on a Sherwin-Williams Mill.

EXAMPLES 13-16

Phthalo blue colorant,
22% Phthaloblue
22% (nonvolatile) resin of Examples 1-4
56% Cellosolve Acetate are prepared as above with seven minutes on the Sherwin-Williams Mill.

In addition to mass tones, the pigment dispersions of Examples 5-16 may be used to tint white paints based on TiO₂ or TiO₂/extender combination dispersed in the various compatible vehicles. For instance when 8 ounces of the dispersion of Example 5 was added to a gallon of standard white paint based on TiO₂ dispersed in a modified alkyd vehicle, the resulting applied finish gave a pastel with excellent gloss and appearance.

EXAMPLE 17

Table 1 demonstrates the compatibility characteristics of the oxazolidine-containing pigment dispersant of Example 1 with various film forming resins, and compares the same with a pigment dispersant of U.S. Pat. No. 3,940,353, having the composition 49 IBOMA/49 MMA/1.5 t-BAEMA/0.5 MAA.

TABLE 1

Compatibility of Product of Example 1 of This Invention vs.
U.S. Pat. No. 3,940,353
(All films consist of 75% vehicle/25% pigment dispersant
copolymer, about 50% solids in Cellosolve® acetate)

| Vehicle | Type | Solution Clarity[1] 3,940,353 | Solution Clarity[1] This Invention | Film Clarity[2] 3,940,353 | Film Clarity[2] This Invention |
|---|---|---|---|---|---|
| Duraplex® A-29 | s.o.[3] alkyd | C[5] | C | C | C |
| Duraplex A-27 | s.o. alkyd | C | C | C | C |
| Duraplex C-55X | m.o. alkyd | C | C | C | C |
| Duraplex D-65A | l.o. alkyd | C | C | C | C |
| Amberlac® 292X | mod. alkyd | C | C | C | C |
| Acryloid® B-66 | T/P[3] acrylic | C | C | C | C |
| Acryloid B-50 | T/P acrylic | C | L.H. | C | L.H. |
| Acryloid AT-64 | T/S acrylic | C | C | C | C |
| Acryloid AT-63 | T/S acrylic | C | C | C | C |
| Uformite® F492 | urea/HCHO | M.H. | M.H. | M.H. | M.H. |
| Uformite F200E | urea/HCHO | L.H. | M.H. | L.H. | M.H. |
| Uformite MM46 | melamine/HCHO | C | C | C | C |
| Uformite MM47 | melamine/HCHO | C | C | C | C |
| Uformite MM83 | melamine/HCHO | H.H. | H.H. | L.H. | L.H. |
| Epon® 1001 | epoxy | C | C | C | M.H. |
| Epon 838 | epoxy | C | C | C | C |
| VAGH (TM) | vinyl | C | C | C | C |
| VMCH (TM) | vinyl | C | C | C | C |
| ½ second R.S. | nitrocellulose | C | C | C | C |
| ½ second S.S. | nitrocellulose | C | C | C | C |
| Paraplex® G-30 | polyester plasticizer | C | C | C | C |
| Acryloid AT-64/ MM83 80/20 | acrylic/mel.-HCHO | H.H. | H.H. | L.H. | L.H. |
| Acryloid AT-70/ E-1001 60/40 | acrylic/epoxy | C | H.H. | C | C |
| Acryloid AT-70/ E-828 80/20 | acrylic/epoxy | C | C | C | C |
| ND77B/MM47 70/30 | N.D. alkyd/ mel.-HCHO | C | H.H. | C | H.H. |
| Acryloid AT-64/ Cymel® 301 70/30 + 0.1 PTSA[4] | acrylic/mel.-HCHO | C | C | C | C |
| Acryloid A21LV ½ R.S./Paraplex G-30 | acrylic lacquer | M.H. | M.H. | C | M.H. |
| Acryloid AT-64/ F240N/ 70/30 | acrylic/urea-HCHO | C | C | C | C |

[1] Hazy solutions were generally cleared via addition of Cellosolve® Acetate or dimethyl formamide before casting.
[2] 10 mil wet casts on glass plate - baked 300° F. - 30'.
[3] s.o. id short oil, m.o. is medium oil, l.o. is long oil, mod. is styrenated (meth)acrylated, TP is thermoplastic, TS is thermosetting
[4] Paratoluene sulfonic acid.
[5] C is compatible; LH, MHm and HH are light, medium and heavy haze.

I claim:

1. A pigment dispersion consisting essentially of 20% to 60% by weight of pigment, 5% to 75% by weight of an organic solvent, and 5% to 35% by weight of a pigment dispersant, said pigment dispersant being a copolymer containing (a) 0.5% to 40% by weight of units derived from a compound having the structural formula

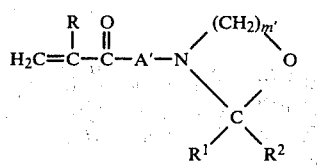

wherein

R is $-(CH_2)_{n'-1}-H$;

R[1], when not directly joined to R[2], is selected from the group consisting of hydrogen, phenyl, benzyl, and alkyl groups having 1 to 12 carbon atoms;

R[2], when not directly joined to R[1], is selected from the group consisting of hydrogen and alkyl groups having 1 to 4 carbon atoms;

R[1] and R[2] when directly joined together with the attached carbon atom of the ring in the formula form a ring selected from the group consisting of pentamethylene and tetramethylene;

A' is $-O(CH_2)_m-$ or $-(O-alkylene)_n-$ in which $-(O-alkylene)_n-$ is a poly(oxyalkylene) group having a molecular weight in the range of 88 to 348, n thus depending on said molecular weight, in which the individual alkylene radicals are the same or different and are either ethylene or propylene;

m and m' are integers having a value of 2 or 3; and n' is an integer having a value of 1 or 2;

(b) 60% to 99.5% by weight of units derived from at least one comonomer selected from the group consisting of styrene, vinyltoluene, and esters of (meth)acrylic acid and alcohols having 1 to 18 carbon atoms; and (c) 0 to 10% by weight of an α,β-ethylenically-unsaturated acid, said copolymer having an Mw of from about 6,000 to 50,000.

2. A pigment dispersion as defined in claim 1 wherein the pigment dispersant is a copolymer containing
(a) 0.5% to 15% by weight of units derived from a compound having the structural formula

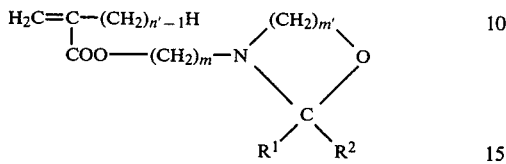

wherein
R$^1$, when not directly joined to R$^2$, is selected from the group consisting of hydrogen, phenyl, benzyl, and alkyl groups having 1 to 12 carbon atoms;
R$^2$, when not directly joined to R$^1$, is selected from the group consisting of hydrogen and alkyl groups having 1 to 4 carbon atoms;
R$^1$ and R$^2$ when directly joined together with the attached carbon atom of the ring in the formula form a ring selected from the group consisting of pentamethylene and tetramethylene;
m and m' are integers having a value of 2 or 3; and n' is an integer having a value of 1 or 2;
(b) 60% to 99.5% by weight of units derived from at least one comonomer selected from the group consisting of styrene, vinyltoluene, and esters of (meth)acrylic acid and alcohols having 1 to 18 carbon atoms; and
(c) 0.2% to 5% by weight of (meth)acrylic acid, said copolymer having an Mw of from 12,000 to 20,000.

3. A pigment dispersion as defined in claim 2 wherein the pigment dispersant is a copolymer containing
(a) 0.5% to 15% by weight of units derived from a compound having the structural formula

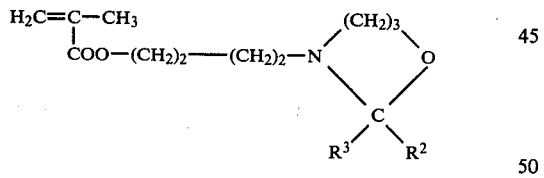

wherein R$^2$ is hydrogen or C$_{1-4}$ alkyl and R$^3$ is hydrogen or C$_{1-12}$ alkyl;
(b) 60% to 99.5% by weight of units derived from at least one comonomer that is a C$_{1-4}$ alkyl (meth)acrylate, and
(c) 0.2% to 5% by weight of methacrylic acid.

4. A pigment dispersion as defined in claim 3 wherein the pigment dispersant is a copolymer containing
(a) units derived from said unsaturated ester of a hydroxyalkyloxazolidine,
(b) units derived from a blend of methyl methacrylate and butyl methacrylate, and
(c) units derived from methacrylic acid.

5. In a method of grinding a pigment dispersed in an organic solvent solution of a pigment dispersant, said dispersion consisting essentially of 5 to 75% of organic solvent, 5 to 35% of pigment dispersant and 20% to 60% by weight of pigment, the improvement wherein the pigment dispersant is a copolymer containing
(a) 0.5% to 40% by weight of units derived from a compound having the structural formula

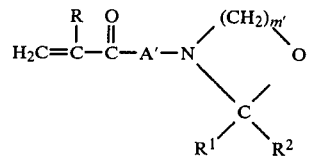

wherein
R is $-(CH_2)_{n'-1}-H$;
R$^1$, when not directly joined to R$^2$, is selected from the group consisting of hydrogen, phenyl, benzyl, and alkyl groups having 1 to 12 carbon atoms;
R$^2$, when not directly joined to R$^1$, is selected from the group consisting of hydrogen and alkyl groups having 1 to 4 carbon atoms;
R$^1$ and R$^2$ when directly joined together with the attached carbon atom of the ring in the formula form a ring selected from the group consisting of pentamethylene and tetramethylene;
A' is $-O(CH_2)_m-$ or $-(O\text{-alkylene})_n$ in which $-(O\text{-alkylene})_n$ is a poly(oxyalkylene) group having a molecular weight in the range of 88 to 348, n thus depending on said molecular weight, in which the individual alkylene radicals are the same or different and are either ethylene or propylene;
m and m' are integers having a value of 2 or 3; and n' is an integer having a value of 1 or 2;
(b) 60% to 99.5% by weight of units derived from at least one monomer selected from the group consisting of styrene, vinyltoluene, and esters of (meth)acrylic acid and alcohols having 1 to 18 carbon atoms; and
(c) 0 to 10% by weight of an α,β-ethylenically-unsaturated acid,
said copolymer having an Mw of from about 6,000 to 50,000.

6. The method of claim 5 wherein the pigment dispersant is a copolymer containing
(a) 0.5% to 15% by weight of units derived from a compound having the structural formula

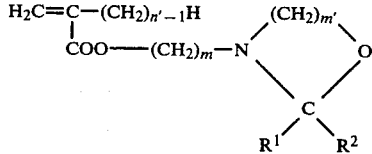

wherein
R$^1$, when not directly joined to R$^2$, is selected from the group consisting of hydrogen, phenyl, benzyl, and alkyl groups having 1 to 12 carbon atoms;
R$^2$, when not directly joined to R$^1$, is selected from the group consisting of hydrogen and alkyl groups having 1 to 4 carbon atoms;
R$^1$ and R$^2$ when directly joined together with the attached carbon atoms of the ring in the formula form a ring selected from the group consisting of pentamethylene and tetramethylene;

m and m' are integers having a value of 2 or 3; and n' is an integer having a value of 1 or 2;

(b) 60% to 99.5% by weight of units derived from at least one comonomer selected from the group consisting of styrene, vinyltoluene, and esters of (meth)acrylic acid and alcohols having 1 to 18 carbon atoms; and (c) 0.2% to 5% by weight of (meth)acrylic acid, said copolymer having an Mw of from 12,000 to 20,000.

7. The method of claim 6 wherein the pigment dispersant is a copolymer containing (a) 0.5% to 15% by weight of units derived from a compound having the structural formula

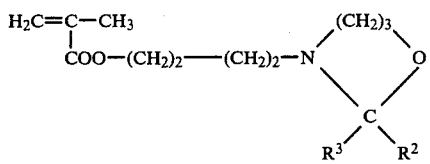

wherein $R^2$ is hydrogen or $C_{1-4}$ alkyl and $R^3$ is hydrogen or $C_{1-12}$ alkyl;

(b) 60% to 99.5% by weight of units derived from at least one comonomer that is a $C_{1-4}$ alkyl meth(acrylate), and (c) 0.2% to 5% by weight of methacrylic acid.

8. The method of claim 7 wherein the pigment dispersant is a copolymer containing (a) units derived from said unsaturated ester of a hydroxyalkyloxazolidine, (b) units derived from a blend of methyl methacrylate and butyl methacrylate, and (c) units derived from methacrylic acid.

9. A pigment dispersion as defined in claim 2 wherein the pigment dispersant is a copolymer containing (a) 0.5% to 15% by weight of units derived from a compound having the structural formula

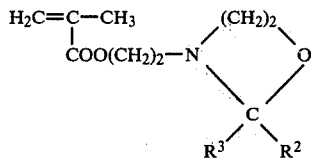

wherein $R^2$ is hydrogen or $C_{1-4}$ alkyl and $R^3$ is hydrogen or $C_{1-12}$ alkyl;

(b) 60% to 99.5% by weight of units derived from at least one comonomer that is a $C_{1-4}$ alkyl (meth)acrylate; and (c) 0.2% to 5% by weight of methacrylic acid.

10. The method of claim 8 wherein the pigment dispersant is a copolymer containing (a) 0.5% to 15% by weight of units derived from a compound having the structural formula

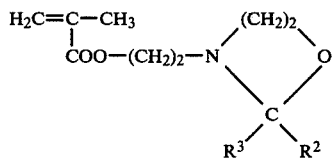

wherein $R^2$ is hydrogen or $C_{1-4}$ alkyl and $R^3$ is hydrogen or $C_{1-12}$ alkyl;

(b) 60% to 99.5% by weight of units derived from at least one comonomer that is a $C_{1-4}$ alkyl (meth)acrylate; and (c) 0.2% to 5% by weight of methacrylic acid.

* * * * *

UNITED STATES PATENT AND TRADEMARK OFFICE
CERTIFICATE OF CORRECTION

PATENT NO. : 4,310,453
DATED : January 12, 1982
INVENTOR(S) : Raymond F. Jenkins and Graham Swift It is certified that error appears in the above-identified patent and that said Letters Patent are hereby corrected as shown below:

Column 2, line 52, that portion of formula IB reading "$-(CH_2)n-$" should read -- $-(CH_2)n'-$ --.

Column 11, line 46, that portion of the formula reading " $-(CH_2)_2-(CH_2)_2-$ " should read -- $-(CH_2)_2-$ --.

Column 13, line 19, that portion of the formula reading " $-(CH_2)_2-(CH_2)_2-$ " should read -- $-(CH_2)_2-$ --.

Signed and Sealed this

Seventh Day of August 1984

[SEAL]

Attest:

GERALD J. MOSSINGHOFF

*Attesting Officer*  *Commissioner of Patents and Trademarks*